United States Patent
Macfarlane

(10) Patent No.: US 11,261,103 B2
(45) Date of Patent: Mar. 1, 2022

(54) WATER MANAGEMENT SYSTEM

(71) Applicant: DMAC IP Pty Ltd, Brisbane (AU)

(72) Inventor: David Campbell Macfarlane, Brisbane (AU)

(73) Assignee: DMAC IP PTY LTD., Brisbane (AU)

(*) Notice: Subject to any disclaimer, the term of this patent is extended or adjusted under 35 U.S.C. 154(b) by 0 days.

(21) Appl. No.: 16/635,718

(22) PCT Filed: Jul. 31, 2018

(86) PCT No.: PCT/AU2018/050796
§ 371 (c)(1),
(2) Date: Jan. 31, 2020

(87) PCT Pub. No.: WO2019/023746
PCT Pub. Date: Feb. 7, 2019

(65) Prior Publication Data
US 2021/0053844 A1 Feb. 25, 2021

(30) Foreign Application Priority Data
Jul. 31, 2017 (AU) .............................. 2017903003

(51) Int. Cl.
*C02F 1/12* (2006.01)
*C02F 1/14* (2006.01)

(52) U.S. Cl.
CPC . *C02F 1/12* (2013.01); *C02F 1/14* (2013.01)

(58) Field of Classification Search
None
See application file for complete search history.

(56) References Cited

U.S. PATENT DOCUMENTS

| 3,450,192 | A | | 6/1969 | Hay |
| 3,903,958 | A | * | 9/1975 | Hay ........................ F24S 10/10 165/50 |
| 4,078,975 | A | | 3/1978 | Spears, Jr. |
| 4,235,680 | A | | 11/1980 | Diggs |
| 4,338,991 | A | | 7/1982 | Sigworth, Jr. |
| 4,343,683 | A | | 8/1982 | Diggs |
| 9,623,344 | B2 | | 4/2017 | Bosch I Bosch |
| 2007/0102359 | A1 | * | 5/2007 | Lombardi .............. B01D 61/58 210/639 |

(Continued)

FOREIGN PATENT DOCUMENTS

ES 2078885 A1 12/1995

OTHER PUBLICATIONS

Golder Assc., Evaporation Pond Design Project Report, 2008, available at https://www.epa.gov/sites/production/files/2015-05/documents/evaporationponddesignreport100708.pdf. (Year: 2008).*

*Primary Examiner* — In Suk C Bullock
(74) *Attorney, Agent, or Firm* — Standley Law Group LLP; Stephen L. Grant; Adam J. Smith

(57) ABSTRACT

An outdoor water management system including at least one reservoir configured to receive highly concentrated contaminated water, a weather proof cover, covering the reservoir to define at least one chamber and water vapour removal means, configured to remove evaporated water from the at least one chamber wherein the at least one chamber is configured to further concentrate the contaminated water while providing long-term weatherproof storage thereof.

19 Claims, 6 Drawing Sheets

(56) References Cited

U.S. PATENT DOCUMENTS

2009/0255797 A1* 10/2009 Longer .................... C02F 1/14
                                                          203/11
2018/0169589 A1    6/2018 Macfarlane

* cited by examiner

FIGURE 4 - SALINITY GRADIENT SOLAR POND

WATER MANAGEMENT SYSTEM

TECHNICAL FIELD

The present invention relates to the management of contaminated water. In particular, although not exclusively, the invention relates to the removal and storage of dissolved solids from water.

BACKGROUND ART

In many areas of Australia, groundwater in traditional agricultural/pastoral as well as coal seam gas, coal mining and other mineral mining has a saline content that is sub-optimal or unsuitable for crop irrigation. Different crops have different salinity tolerance thresholds, and when salinity exceeds these thresholds, crop yield and crop quality is generally reduced. Certain high value crops, such as lettuce and beans, have low water salinity thresholds.

When only supra-optimal salinity irrigation water is available, farmers must either choose to limit themselves to crops that tolerate salinity, or attempt to grow salinity sensitive crops at lower yields, as traditional desalination of such water is cost prohibitive. As such, in many of these regions, high value fruit and vegetables cannot be reasonably grown and must be imported.

Furthermore, the mining of coal and other minerals and the production of coal seam gas is usually associated with waste waters of varying levels of salinity and contaminants, which must be managed in an environmentally safe manner. As the pH of mine tailings may be very low (e.g. pH 2) or very high (eg pH 11), tailings must often be neutralised prior to membrane based filtration and dewatering/desalination, which is very costly. Even when neutralised, the treatment of such saline water to meet environmental compliance conditions is generally very costly.

Major environmental hazards are also often associated with mines, particularly when abandoned. As the cost of treating mine tailings is high, such tailings are often held in pits and dams until another entity takes over responsibility of the mine, which poses risks relating to overflowing in case of extreme weather events.

Certain attempts have been made to reduce costs associated with processing such mine tailings through natural rates of evaporation. However, as evaporation is slow, and such pits are exposed (and thus receive rainwater), evaporation may need to be enhanced. Currently the only commercially available option to enhance the evaporation of large water surfaces is to use high energy input cannon misting systems.

A problem with such systems is that saline aerosol material is generally blown off the water treatment site which results in unacceptable environmental contamination. System such as these are extremely energy intensive ie at its most efficient level using 270 litres of diesel/ML versus 25-30 litres of diesel for irrigation of within limit irrigation water.

As such, there is clearly a need for improved renewable energy driven, more cost-effective, simple enhanced waste water management systems.

It will be clearly understood that, if a prior art publication is referred to herein, this reference does not constitute an admission that the publication forms part of the common general knowledge in the art in Australia or in any other country.

SUMMARY OF INVENTION

The present invention is directed to waste water treatment and/or integrated water management systems, which may at least partially overcome at least one of the abovementioned disadvantages or provide the consumer with a useful or commercial choice.

With the foregoing in view, the present invention in a first aspect resides broadly in an outdoor water management system including:

a reservoir configured to receive highly concentrated contaminated water;

a weather proof cover, covering the reservoir to define a chamber; and water vapour removal means, configured to remove vapour from the chamber;

wherein the chamber is configured to further concentrate the contaminated water while providing long-term weather-proof storage thereof.

The reservoir is preferably configured to receive raw saline groundwater or wastewater of diverse salinity or highly concentrated contaminated waste water which may have had prior desalination or other treatment which can supply waste water, ideally under gravity and ideally with passive heating in transit to an accelerated water evaporation system.

In a preferred embodiment, a number of reservoirs are provided, preferably in series and the water to be treated will preferably flow through each reservoir in turn.

In a preferred embodiment, the system includes an accelerated evaporation system including at least one and typically a number of reservoirs in the form of shallow depth, long narrow, lined enhanced evaporation ponds (LEPs). The LEP's are preferably shallow and roofed to exclude rainfall and may be managed:

a) individually or
b) as integrated batches or
c) under continuous flow (gravity or solar pumping) between LEP's to achieve target evaporated concentrations of hypersaline/hyper-mineralised waste which is then removed via a waste removal system.

Each of the LEP's may operate or include one or more subsystems which have different evaporation potentials and applications. Typically, the LEP's may be classified according to the sub-system(s) utilized in the LEP.

All LEP's sub-systems are preferably roofed to remove rainfall, receive external insulated pipe heated water delivery for heat exchange within shallow water LEPs and have the same saline waste removal system conveying hypersaline waste/with some crystalline salt to a waste storage reservoir.

Sub-System A preferably adds heat, generally through the addition of heated air, at above atmospheric temperature, controlled aerosol production to increase effective surface area and vacuum vapour removal and condensation of vapour. It is important in Sub-System A that no aerosols return to the evaporating water surface. If they do this will cool surface water temperatures and be counter-productive and reduce evaporation.

Sub-System B LEPs preferably have include expandable/retractable roofs which are closed typically only when rainfall is imminent and which are open at all other times. The expandable/retractable roofs are preferably motorized and automatically controlled.

Sub-System 3 LEPs preferably have moderately inclined hip roofs (in environments with reliable prevailing wind direction) which are used to funnel wind across the LEPs and/or increase wind speed and therefore maximizing evaporation.

The system of the present invention preferably includes at least one terminal reservoir, preferably with a rainfall excluding and vapour collecting roof, configured a) to receive highly concentrated contaminated salinized or mineralized water from any source as a waste storage reservoir. In a particularly preferred embodiment, this reservoir may be up to 125 m long, approximately 3-4 m deep with excavated walls of about 60 degrees slope and is preferably provided with at least some of:

heating, typically solar heating,
hypersaline contents agitation,
controlled pumping to produce aerosols above the final evaporation volume and
low vacuum vapour removal, designed to maximize the rate at which salts and contaminants crystallize. This reservoir is preferably provided with a roof which is able to be temporarily retracted to enable mechanical removal of entrained or crystallized salt if it has a commercial value.

In another aspect, the present invention resides in a system of outdoor shallow depth, long narrow lined enhanced evaporation ponds (LEPs) which may be managed individually or as integrated batches or under continuous flow (gravity or solar pumping) between the LEPs to achieve target evaporated concentrations of hypersaline/hyper-mineralised waste and a waster removal system which connects with at least one LEP.

At least one of the LEPs will preferably operate according to any one or more of three preferred variations or subsystems including:

a) at least one LEP configured to receive pre-heated contaminated water with additional heat exchange, typically from externally solar heated water and/or air heating, typically including a permanent arched or gable roof with low vacuum extraction of vapour at various points along the apex, preferably for the production of condensate for beneficial use, with or without the presence of controlled pressurized jets producing uniform sized droplets to enhance effective evaporating water surface area and completely evaporate in the upper atmosphere of the reservoir volume;

b) at least one LEP configured to receive pre-heated contaminated water with additional heat exchange, preferably from externally solar heated water, a motorized remotely controlled expandable/retractable gable and/or hip roof system permanent arched or gable roof capable of intercepting rainfall with drainage to the environment or for collection for beneficial use;

c) at least one LEP configured to receive pre-heated contaminated water with additional heat exchange, preferably from externally solar heated water and 30 degree or greater slope hip roofs used to accelerate wind speeds thereby increasing evaporation rates while intercepting rainfall with drainage to the environment or for collection for beneficial use.

Any of the LEPs may include one, some or all of the above variations or sub-processes.

In another aspect, the present invention resides in a system of rectangular, insulated, lined 2.5-3.5 m deep salinity gradient solar thermal lined enhanced evaporation ponds (LEPs), able to be integrated with parabolic mirror solar thermal systems to maintain insulated heated water and heated air capacity of exchanging heat in LEPs at up to 80 deg C.

In another aspect, the present invention resides in a system of rectangular, insulated, lined 2.5-3.5 m deep salinity gradient solar thermal ponds (SGSPs) which are approximately 9 m wide at the surface and 5 m wide at the base and 50 m long which are able to be integrated with parabolic mirror solar thermal systems to maintain insulated heated water and insulated heated air capacity of exchanging heat in LEPs at up to 80 deg C.

A condensation system may be provided relative to any of the LEPs preferably involving vapour removal from the evaporation chamber using deliberate vapour pressure difference management and then utilising sufficient temperature reduction (up to 10 degrees Celsius) to produce condensate used beneficially directly or which may be mixed with harvested rainfall from reservoir covers and which may be mixed with raw waste water for beneficial use, including irrigation of crops suited to such irrigant chemistry.

In the evaporation chamber such as that embodied as System 2A preferably with solar and air heating and vapour pressure deficit enhancement through application of low vacuum as well as increased effective evaporative surface area through carefully controlled uniform sized aerosol production, a 15-20 fold increase in evaporation is predicted. Systems 2B and 2C have potential for 6-10 times evaporation enhancement over baseline, depending in particular on water temperatures and windspeeds maintained.

As LEP water in any system becomes increasingly saline sub-surface pond water bubbling or sparging may be used. The sub-surface pond water bubbling or sparging may also be applied to relevant LEPs once evaporation water Total Dissolved Solids (TDS) exceeds 40,000 mg/L in order to maintain evaporation rates. Once TDS exceeds 40,000 mg/L TDS in natural evaporation processes water boundary layer tensions increase which adversely affects the rate of evaporation The present invention can operate effectively from pH 2 and above. It can be quickly and cheaply installed on lands adjacent to existing mine tailings, CSG brine dams and other contaminated water storages. Ultimately, a fully optioned process according to the present invention which captures most vapour from LEPs and the storage and condenses vapour to pure water/distillate/condensate will provide primary and secondary waste water treatment as one integrated management system.

Preferably, the contaminated water comprises moderately saline water (10,000 uS/cm or 6500 mg/L TDS) to hypersaline water up to 300,000 mg/L. More preferably, the contaminated water comprises water with a total dissolved solid (TDS) content of at least about 100,000 mg/L. Suitably, the TDS content of the contaminated water may be between about 150,000 and 400,000 mg/L.

Preferably, the reservoir comprises an elongate, shallow channel. Suitably, the elongate channel comprises an artificially defined pond. The pond may be defined by a grader or scraper. The grader or scraper may be laser guided. The shape of the pond is such that evaporated water preferably drains to a low point for transfer, ideally under gravity, and thence to one or more sequential ponds, ideally under gravity. The pond may be defined as a series of shallow circular HDPE tanks up to 1.5 m deep. Preferably however, a preferred shape is longitudinal, rather than round preferably having an elongate, narrow configuration evaporation ponds, typically up to a maximum of approximately 3 m deep. The or each pond may include one or more waste product storage segments capable of being filled and sealed.

A 2.5-3 m deep salinity gradient solar-thermal pond (SGSP) may be included in the system, preferably augmented by solar parabolic mirror thermal energy as required.

Preferably, the or each pond is about 0.3-0.4 m deep and up to 1 m deep in cyclone or heavy tropical downpour regions where rainfalls of up to 500 mm/day can occur.

Preferably, the pond is approximately 6.7 m wide at the base, using the preferred lining 8 m width material.

Preferably, the or each pond has a laser levelled base with a slight slope of 2 cm to the proposed side from which concentrated waste water can drain under gravity or be time-controlled solar pumped from one pond to the next from which sidewalls upwardly and outwardly extend. It is preferable that the downslope side of the LEP has a uniform depth channel of 15 cm prior to a downslope bund. This serves to concentrate increasingly saline evaporated water moving from one LEP to the next ready for gravity transfer or solar pumping.

Preferably, the sidewalls extend upwardly and outwardly from the base at an angle of about 45 degrees for length of about 30-40 cm. Preferably there is a margin of 25-30 cm of HDPE liner which folds over the top of the sidewall and which is buried under compacted wall material. Preferably this action is undertaken with mechanical grading and rolling equipment immediately preceding the mechanical rolling out of the normal 1.8 tonne rolls of 125 m×8 m wide HDPE sheet. Preferably sheet laying involves a telehandler with a suitable spreader bar which has suitably sized spigots which neatly fit into the central core of the roll and which accurately reverses along the exact mid-point of the laser graded long narrow bunded pond.

Normally HDPE sheet used will be high density polyethylene sheet (HDPE of 2 mm thickness and 8 m total width with a roll length of 125 m. If transfer of evaporating, increasingly saline water is to be gravity transferred between one LEP to the next or from LEP to the preferred waste storage pond, then 75-100 mm sealed pipework with 5% slope will be fitted once sheet is rolled out and edges are secured in the pond bund. If solar pumping is used then a flexible hose will transfer water from the solar sump pump in the LEO waste water collection channel. Before purchase of sheet the evaporation water chemistry and the proposed maximum temperature that the evaporation system will operate at must be specified to the supplier who then certifies that the selected product will, subject to nil physical damage in laying, will maintain structural integrity for at least 20 years. Subject to positive feasibility, if simple air cell sheet underlaying HDPE sheet or other cost-effective, rapidly laid insulation material significantly reduces water heat loss conduction through the HDPE floor then it should be included in the construction design. Such insulation sheet would be rolled out in suitable length sections ahead of the HDPE sheet roll out.

Preferably, compacted bunds are defined along opposing sides of the pond. Generally, the bunds will have a vertical height of 30-35 cm but they may be up to 1 m vertical height in high rainfall areas. In laser grading of pond floors and construction of bunds 90 to 100 mm flexible PE tubes will be laid with a 5% incline. The bunds may be about 1.5 m high. The bunds may be formed of compacted soil.

Preferably, each pond or reservoir is lined. The reservoir may be lined with HDPE sheeting which meets specific performance requirements. Suitably, the waste storage reservoir is double lined with HDPE sheeting designed to meet the maximum temperature specifications of entrained water in a specific environment. The space between double liners may be insulated.

Preferably, weather proof covers comprise an arched or gable plastic roof where mechanical vapour extraction is envisaged with or without condensation. The plastic roof may be translucent. The plastic roof may be transparent. The plastic roof may be UV stabilised. The plastic roof may be retractable.

The contaminated water may enter the or each reservoir under gravity. Alternatively, the contaminated water may be pumped through the system. In the case of the waste contaminated water may be pumped at a rate to add turbulence to the water in the or each reservoir and enhance evaporation. In the case of LEPs, one or more of the final ponds in a series may benefit from turbulent pond-pond transfer pumping as well as final LEP to saline water piped transfer to the preferred waste storage pond.

The system may further comprise an agitator, configured to agitate the contaminated water in the reservoir. The agitator may operate continuously or intermittently Any one or more of the LEPs in the system may further comprise one or more nozzles attached to fixed or rotating sprinklers, configured to spray water within a specified pressure and droplet size range from the reservoir within the chamber. The nozzles may be configured to enhance evaporation of the water.

The nozzles may be controlled by a controller. The nozzles may be configured to operate only when an evaporation water level is above a threshold. The nozzles may be configured to operate according to a time of day. The nozzles may be configured to operate according to a temperature. If the elongate pond or the circular HDPE tank/pond does not have an arched plastic roof or if it is retracted, the nozzles may be configured to operate within a windspeed range and the pond would normally be configured to minimise lateral moving aerosols and/or be bordered by a barrier, in a preferred form, 1.5 m high polypropylene mesh fence to intercept any lateral moving aerosols.

The removal of water vapour collecting beneath the arched or gabled roof may require one or more ports through which vapour passes to an external condenser. Such vapour may be removed from the port through a negative pressure differential.

The vapour removal means may be coupled to a condenser, for condensing water from the vapour supply. The negative pressure differential is preferably driven by a vacuum pump connected to a condensate tank which is fed by a high thermal conductivity tube (preferably copper) filled with copper mesh and surrounded by a polyethylene pipe jacket filled with water. Exposing all vapour exiting the roof port(s) to a 10 degree C. drop in temperature is expected to condense all vapour. Operationally all vapour produced in the LEP would be expected to exit through roof port(s) and 85% of all vapour entering the condenser would be expected to be condensed as distilled water.

The contaminated water may be heated prior to entering the reservoir. The contaminated water may be heated within the reservoir. Contaminated water in the elongated ponds or circular HDPE ponds will be normally kept as shallow as practicable, ideally 40 mm, to maximise the natural within pond heating above the black HDPE pond liner. HDPE ponds do not generally need any liners.

The contaminated water may be heated using additional solar energy derived from recirculating contaminated water from the base of the pond through a recirculation through a polypropylene pipe network, which may be insulated, which passes through salinity gradient solar ponds (SGSPs) gr solar heat sinks which have water temperatures up to 100 C.

In another aspect, the invention resides broadly in an outdoor water treatment system including:

at least one reservoir configured to receive contaminated water;

at least one nozzle configured to spray the contaminated water to enhance evaporation of water in the at least one reservoir to concentrate the contaminated waste water; and means for preventing the sprayed water from leaving an area defined above the at least one reservoir; and a salinity gradient solar pond to provide additional heat to the at least one reservoir receiving contaminated water to accelerate evaporation and a terminal pond to receive hypersaline contaminated water and further evaporate it to crystalline salt.

Preferably, the contaminated water comprises saline water. More preferably, the contaminated water comprises water with a total dissolved solid (TDS) content of at least about 2000 mg/L. Suitably, the TDS content of the contaminated water may be between about 2,000 and 60,000 mg/L. The TDS content may be up to about 200,000 mg/L.

Preferably, each of the at least one reservoir comprises an elongate channel. Suitably, the elongate channel comprises an artificially defined pond. The pond may be defined by a grader or scraper. The grader or scraper may be laser guided.

Preferably, the or each pond or reservoir is about 2.2-2.5 m deep. Preferably, at this depth, multiple zones can be formed, namely a surface or upper Convective Zone (UCZ) preferably approximately 0.3 m deep, a moderately saline middle layer or gradient or non-convective zone, preferably approximately 1 m deep and a highly saline deep layer with up 1200 kg salt/$m^3$, referred to as a lower convective or storage zone, also preferably approximately 1 m deep. In this configuration, the salinity gradient solar pond is configured to provide efficiently store solar energy and to efficiently transfer such heat through heat exchange to heat target water or air. direct solar heating. This configuration represents a major opportunity in Australia with an average 18 MJ/$m^2$ per day (ranging from 12 to 23 MJ/$m^2$ per day. Without energy losses from water surface or through pond lining, 18 MJ/$m^2$ per day is capable of heating water by 2 degrees C./day. Preferably, the pond includes a substantially planar base, from which sidewalls upwardly and outwardly extend.

The terminal pond, the waste storage pond would typically always be coupled in parallel with a salinity gradient solar pond (SGSP) such that any hypersaline solution in the evaporating SS volume (mainly at the top of the volume being less dense (1.2-1.4 g/cc) than crystalline salt of (2.2 g/cc), would be able to be periodically decanted off and transferred to the basal non-convective zone of the SGSP).

Preferably, all reservoirs or ponds are lined either physically with a polymeric layer or a spray application to seal. All reservoirs will generally be lined with HDPE sheeting with temperature and chemistry specifications which are fit for purpose. The salinity gradient solar pond and the terminal crystalline salt pond (the waste storage pond) may be double HDPE sheet and double geo-membrane lined with specifications fit for purpose and a suitable interstitial space may be filled with a polystyrene sheet (up to 100 mm thick) or sprayed polyurethane (50 to 75 mm thick) to other insulating product (up to 100 mm thick) to reduce heat losses from contained SGSP or terminal crystalline salt pond volumes. Preferably all pipework from SGSPs is insulated also to minimise energy losses to target long narrow evaporation ponds. In large projects there may be up to 200×125×8 m wide lined, long, narrow evaporation ponds with suitable crystalline salt pond and SGSP capacity to support required designed project crystalline salt storage and evaporation pond design capacity.

Preferably, the area defined above the at least one reservoir is defined by at least one weather proof cover, covering the at least one reservoir to define at least one chamber.

Preferably, the weather proof cover comprises a suitably configured roof to exclude rainfall. A roof cover may also be required to: a) harvest vapour ascending from the evaporating saline pond water surface or b) to funnel wind and therefore increase the velocity of wind passing over the pond surface to enhance evaporation. To achieve a) a curved roof structure or a gable roof structure would be preferable. To achieve b) a hip roof which is able to be pitched to maximise interception of seasonal winds from opposing directions would be preferable. Roof covering material may be fixed or it may be retractable and expandable and opening and closing of a roof may be manual or it may be motorised. The operation of motorised roofs, preferably, would be remotely controlled by cloud-based information system which manages site real-time weather and system operational data. Roofs may cover one pond or two adjacent ponds. Fixed roof covers would be maximum strength approximately 200 micron plastic used in greenhouses. In cyclone prone areas roof covers would be secured by aluminium strapping screwed to the roof frame. Retractable/expandable roof covers of 127 m length covering 125 m ponds would be clear high-grade greenhouse plastic or a plasticised translucent plasticised polypropylene depending on engineering strength requirements of the retraction and expansion process. Hip roofs designed to augment solar thermal heating of pond water as well as maximising wind speeds to would cover one or two ponds and these roofs would be fixed. However, the pitch of these roofs would be adjustable for seasonal wind direction change using circular or RHS steel posts which slide within slightly larger pile driven posts. Such posts would be driven immediately following LEP HDPE lining and securing with compacted earth. The roof cover may be translucent. The plastic roof may be transparent. The plastic roof may be UV stabilised. The plastic roof may be retractable.

Preferably, the system includes vapour removal means, configured to remove vapour from the chamber.

The vapour removal means may comprise a port, from which the vapour is removed. The vapour may be removed from the port through a negative pressure differential.

The vapour removal means may be coupled to a condenser, for condensing vapour to form the condensate.

Preferably, the area defined above the at least one reservoir is defined by one or more walls configured to intercept droplet or aerosol drift from the at least one nozzle. The walls may be configured to return all of the intercepted droplet or aerosol drift to the reservoir.

The walls may comprise dense mesh. The walls may comprise hessian or polypropylene mesh.

The nozzles may comprise nozzles of sprinklers. The sprinklers may comprise a lattice of sprinklers. The sprinklers may comprise of low pressure, low trajectory sprinklers. The nozzles may be configured to provide a uniform, or near uniform droplet size.

The nozzles may be controlled by a controller. The nozzles may be configured to operate only when an evaporation level is above a threshold. The nozzles may be configured to operate according to a time of day. The nozzles may be configured to operate according to an environmental factor, such as temperature or wind speed.

The contaminated water may be heated prior to entering the reservoir. The contaminated water may be heated within the reservoir system. The contaminated water may be recirculated and piped in insulated piping through the deep, high temperature, non-convective layer of the SGSP to further increase contaminated water temperatures and therefore evaporation rates.

The contaminated water may be heated using solar energy. The contaminated water may be heated using water pipelines and/or solar heat sinks.

The system may be configured to receive water continuously.

Preferably, each of the at least one reservoir has a substantially planar base, which is inclined to cause highly concentrated water to move to a low end of the base.

Preferably, the system comprises a plurality of reservoirs. Preferably, at least two reservoirs are coupled in series. Preferably, at least two reservoirs are coupled in parallel. The terminal crystalline salt pond would always be coupled in parallel with the SGSP such that any hypersaline solution in the evaporating SS volume (mainly at the top of the volume being less dense (1.2-1.4 g/cc) than crystalline salt of (2.2 g/cc), would be able to be periodically decanted off and transferred to the basal non-convective zone of the SGSP)

Preferably, an output of the at least one reservoir is coupled to an outdoor water management system of the first aspect.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figure 1:
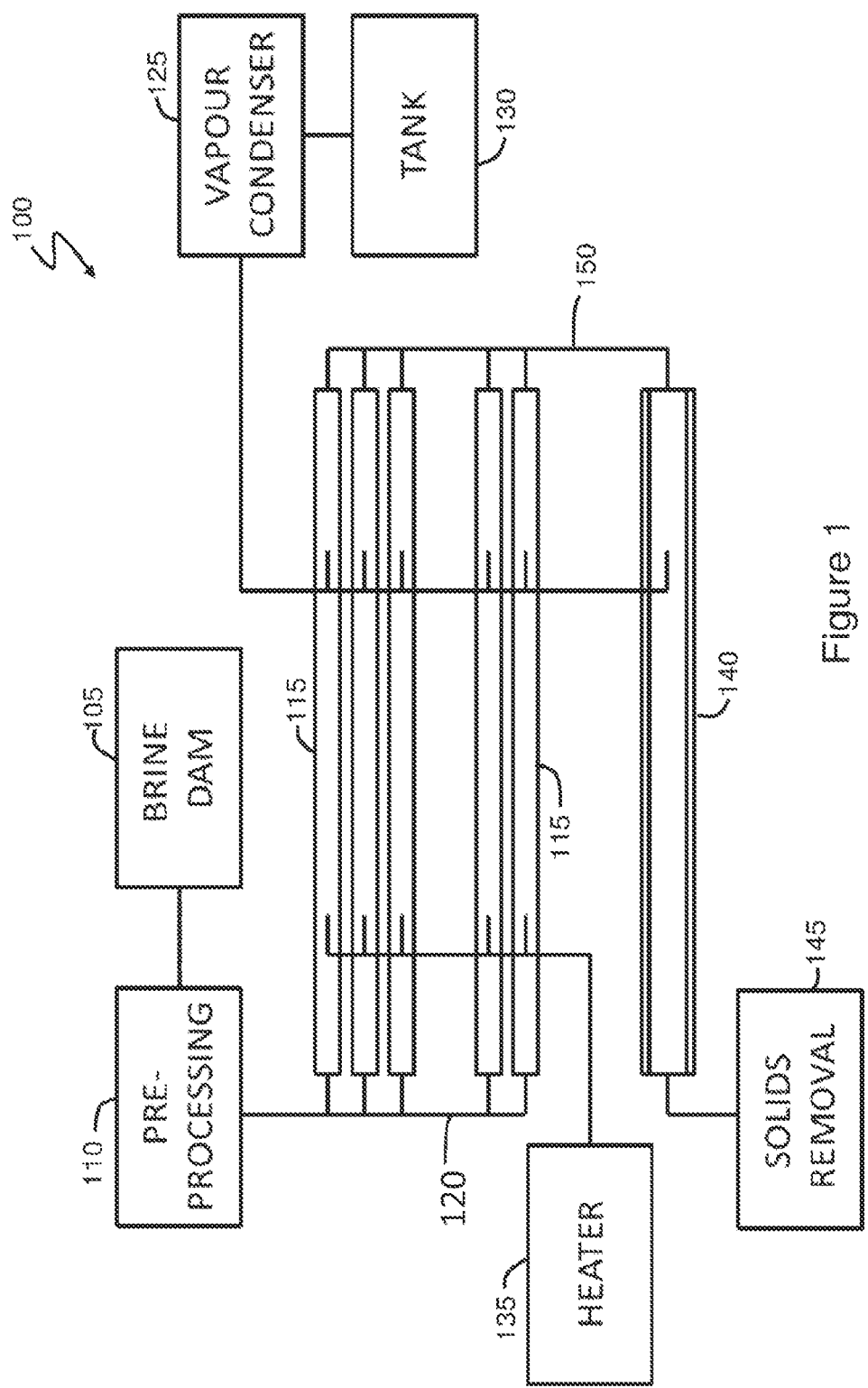
FIG. 1 illustrates a water treatment system, according to an embodiment of the present invention for treatment of salinized and mineralised wastewater.

FIG. 1 illustrates a water treatment system 100, according to an embodiment of the present invention. The water treatment system 100 is particularly suited to concentrating salts (salinized and mineralised wastes) from water, but may also be used to separate other dissolved and suspended solids from water.

As described in further detail below, the system 100 utilises and array of enclosed evaporation ponds, which are configured to enhance evaporation using sprinklers and heating, and from which vapour is condensed to water for beneficial use. The resultant waste concentrate is then safely stored nearby in a storage and evaporation pond where it is easily retrieved as needed The system 100 is described with reference treatment of water from a high natural groundwater salinity/mine tailings dam or from a reverse osmosis, forward osmosis, membrane distillation, thermal distillation, ion exchange or other primary water treatment desalination system used individually or in some combination These dams usually contain water with salinities ranging from about 2000 to 60000 mg/L Total Dissolved Solids (TDS). In other embodiments, brine from membrane distillation units having up to about up to about 200,000 mg/L TDS may be treated. The skilled addressee will, however, readily appreciate that any suitable brine, mineralised or otherwise contaminated water may be treated.

Initially, salinized/mineralised wastes from the "brine" dam 105 is pre-processed in a pre-processing module 110. The pre-processing may comprise heating of the brine, the addition of chemicals or additives to the brine, or removal of suspended solids (SS) or turbidity or specific toxic or other chemistries pre accelerated evaporation. Brine heating under pre-processing in 100 can be from SGSP, transfer of water using a plurality of small pipes versus one large pipe and parabolic mirror super-heated salts.

The pre-processed brine is then provided to a plurality of evaporation ponds 115 which rapidly evaporate and concentrate the brine into a hypersaline state and to recover the evaporated water for beneficial use. The evaporation ponds 115 are coupled to the pre-processing module 110 in parallel by a plurality of pipes 120, which are also configured to primarily pre-heat the brine, remove any specific problem micro-chemistry and possibly filter additional SS. In particular, the pipes 120 are advantageously dark in colour, and thus configured to be heated by the sun, and may extend across a UV attractive material.

Furthermore, the pipes 120 may be associated with a parabolic solar mirror, or other heater, to heat the water in transit to accelerated evaporation. Similarly, the pipes 120 may comprise 13-19 mm polyethylene pipes which travel large distances on HDPE sheeting or on beds of fine basalt aggregate or granular alumina to augment the heating of pipes 120 and thus the water therein.

The evaporation ponds 115 are long and narrow, and may be up to 125 m long. The ponds 115 are configured to operate best when the brine (or waste water) is at a depth of up to about 100 mm, as this increases direct solar heating efficiency, and may heat the water by about 6-15° C. during the day, depending on season. In any event, the ponds 115 are capable of containing brine at a depth of about 1.5-2 m if needed.

Figure 2:
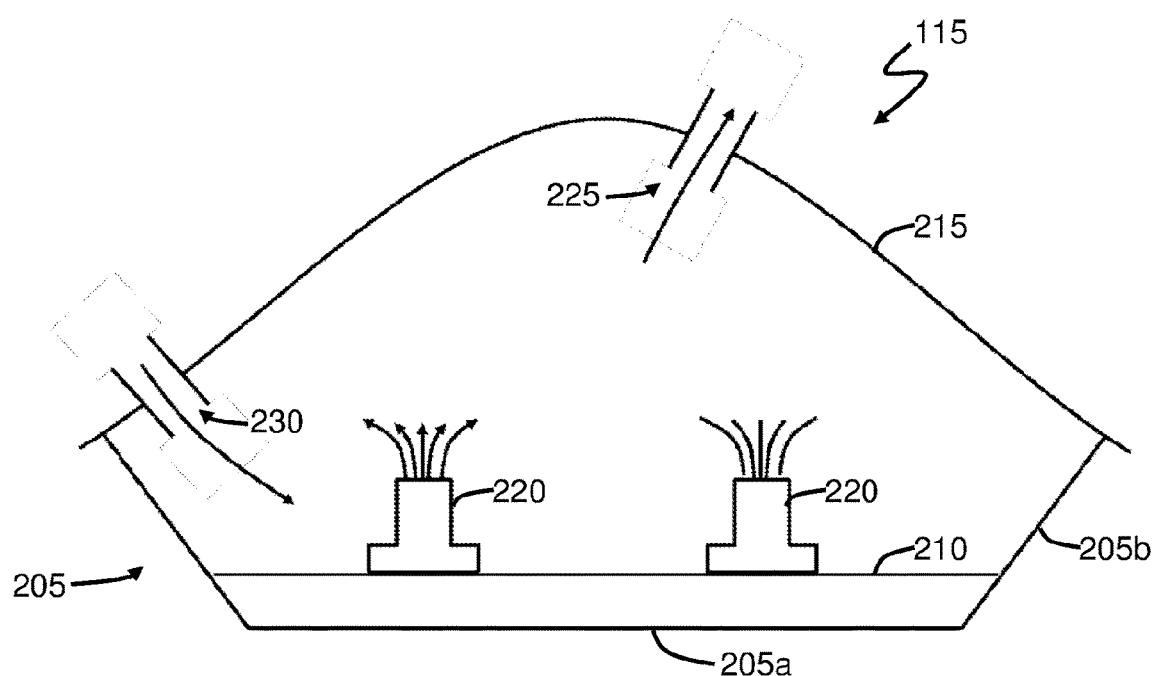
FIG. 2 illustrates a cross sectional view of an evaporation pond of the water treatment system of FIG. 1.

Conduit 150 or a waste removal system is provided to remove the waste products from evaporation ponds 115 to the As best illustrated in FIG. 2, the evaporation ponds 115 comprise a reservoir 205, in which contaminated water 210 is held, and a weather proof cover 215, covering the reservoir 205 to define a chamber.

Floating sprinklers 220 (individual or in latticed formation) are provided on the contaminated water 210 and is configured to spray water in the chamber from a plurality of nozzles. The sprinklers 220 are low pressure, low trajectory, uniform droplet sprinklers. The cover 215 prevents the sprayed water from leaving the chamber and contaminating the environment, regardless of environmental considerations such as wind.

The cover 215 is formed of UV stabilised, transparent plastic, which is about 1.5 mm thick and is supported by a frame. The cover 215 is retractable, to provide evaporating wind and human access to the reservoir 205.

The cover 215 defines an arched roof over the reservoir 205, and includes vapour outlets 225 near an apex of the arched roof. As illustrated in FIG. 1, the vapour outlet 225 is coupled to a condenser 125 for condensing water from the vapour. The condensed water is then stored in a tank 130, for later use.

The vapour outlets 225 are located periodically along a length of the cover 215, and the condensate may be removed from the outlets 225 through a negative pressure differential. This may be achieved by providing below atmospheric pressure at the condenser 125. The use of the cover 215 and low pressure outlets 225 leading to the condenser 125 increases evaporation rates in the reservoir 205.

The extracted vapour may be beneficially used in households or the community more generally. As such, embodiments of the present invention are particularly useful in areas adjacent to sea water or other bodies of currently unused saline/mineralised waters. As an illustrative example, the condensed water may be used as potable water, for irrigation, for domestic consumption or for blending with waste water to lower salinity sufficiently for irrigation of salinity tolerant crops on suitable soils.

The cover 215 also includes heating inlets 230, through which heated water air and, optionally, heated water can be provided if this augments rates of accelerated evaporation (both pipeline systems being insulated). As illustrated in FIG. 1, the heating inlets 230 are coupled to a heater 135 from which the heated air (via a radiator) or directly pumped heated water is provided. The heater 135 may comprise a heat sink and heat transfer means, as outlined below.

The reservoir 205 may be formed in the ground by a grader and/or or scraper. The grader or scraper may be laser guided, which provides an accurate even depth. The reservoir 205 is high-density polyethylene (HDPE) lined, which prevents the contaminated water 210 from leeching into the environment.

The reservoir 205 includes a planar base 205a, from which sidewalls 205b upwardly and outwardly extend. The reservoir 205 may be graded such that it slopes slightly towards one end. As higher salinity water naturally sinks to the floor underlying fresher water, the sloped base 205a allows hypersaline water to naturally move to a low point from which it can pumped (or fed by gravity) to other evaporation ponds 115 or a storage pond.

The evaporation ponds 115 are illustrated as being coupled in parallel in FIG. 1. However, in alternative embodiments, the evaporation ponds 115 may be coupled in series (such that the waste water is progressively concentrated), or in a combination of series and parallel.

The evaporation ponds 115 are coupled to a storage pond 140 which is configured to receive the hypersaline waste water from the evaporation ponds 115, and further evaporate it in a structure capable of providing long-term, weatherproof, sealed storage of the concentrate. The storage pond 140 may also be used for short or medium-term storage prior to commercial use, if desired.

Figure 3:
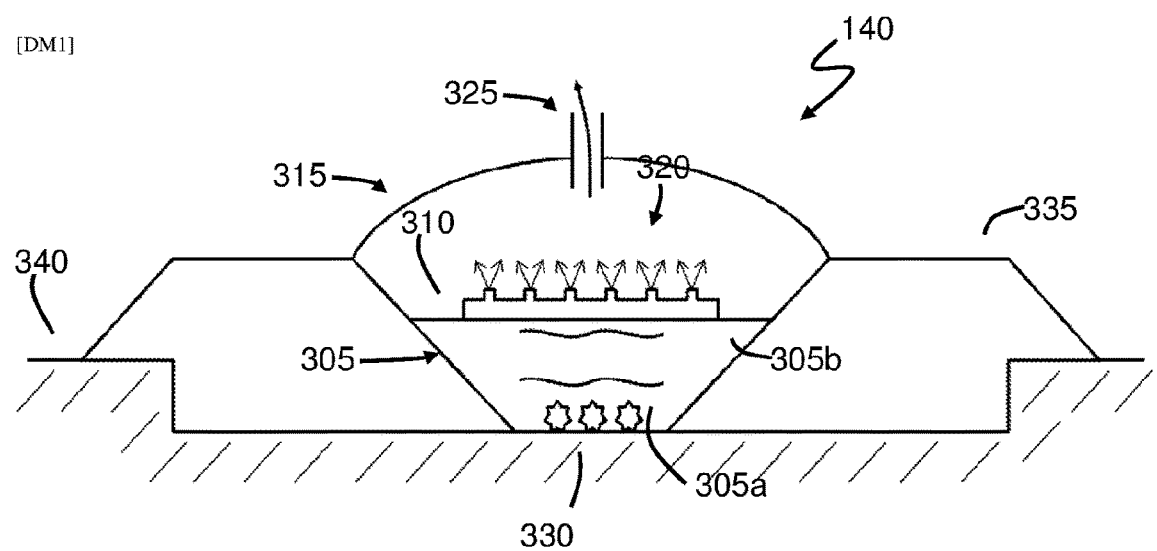
FIG. 3 illustrates a cross sectional view of the terminal storage pond of the water treatment system of FIG. 1 which contains crystalline salt.
Figure 4:
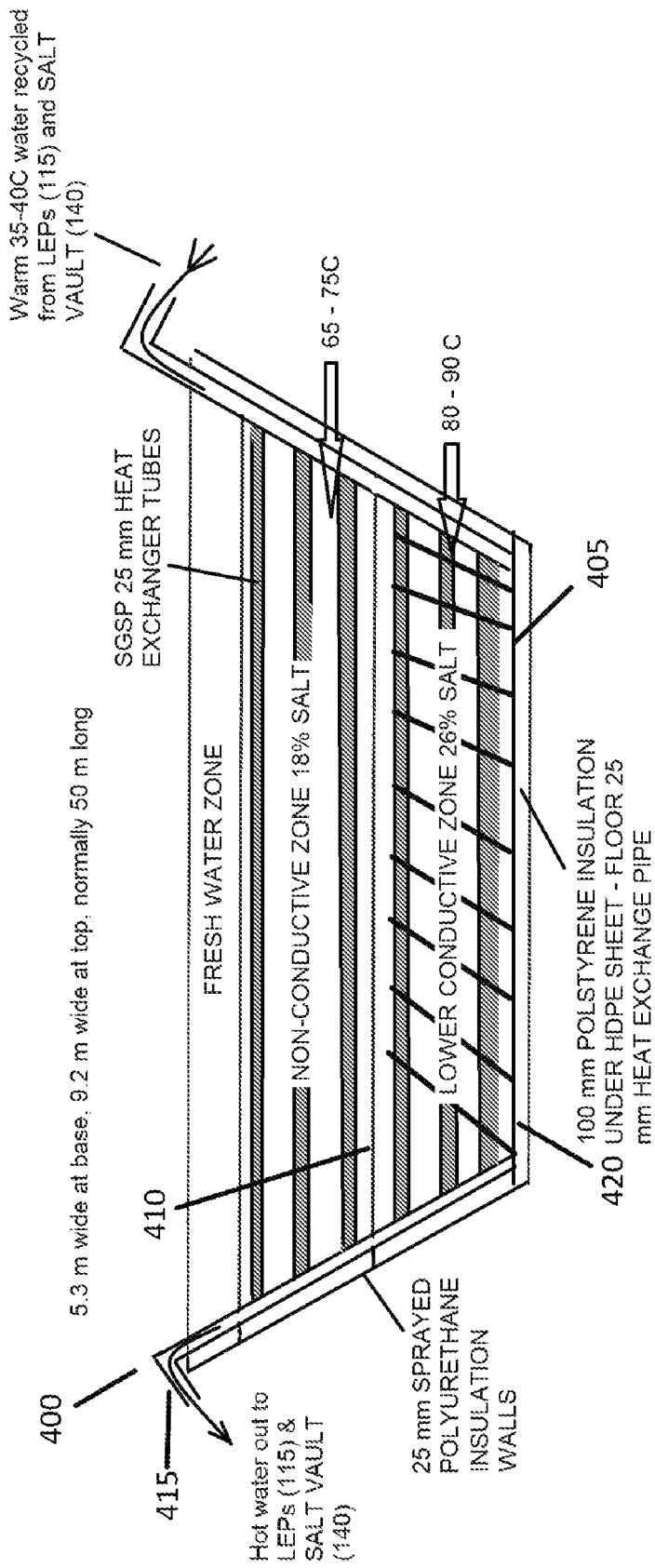
FIG. 4 illustrates a cross sectional view of a saline gradient solar pond (SGSP) of the water treatment system.
Figure 5:
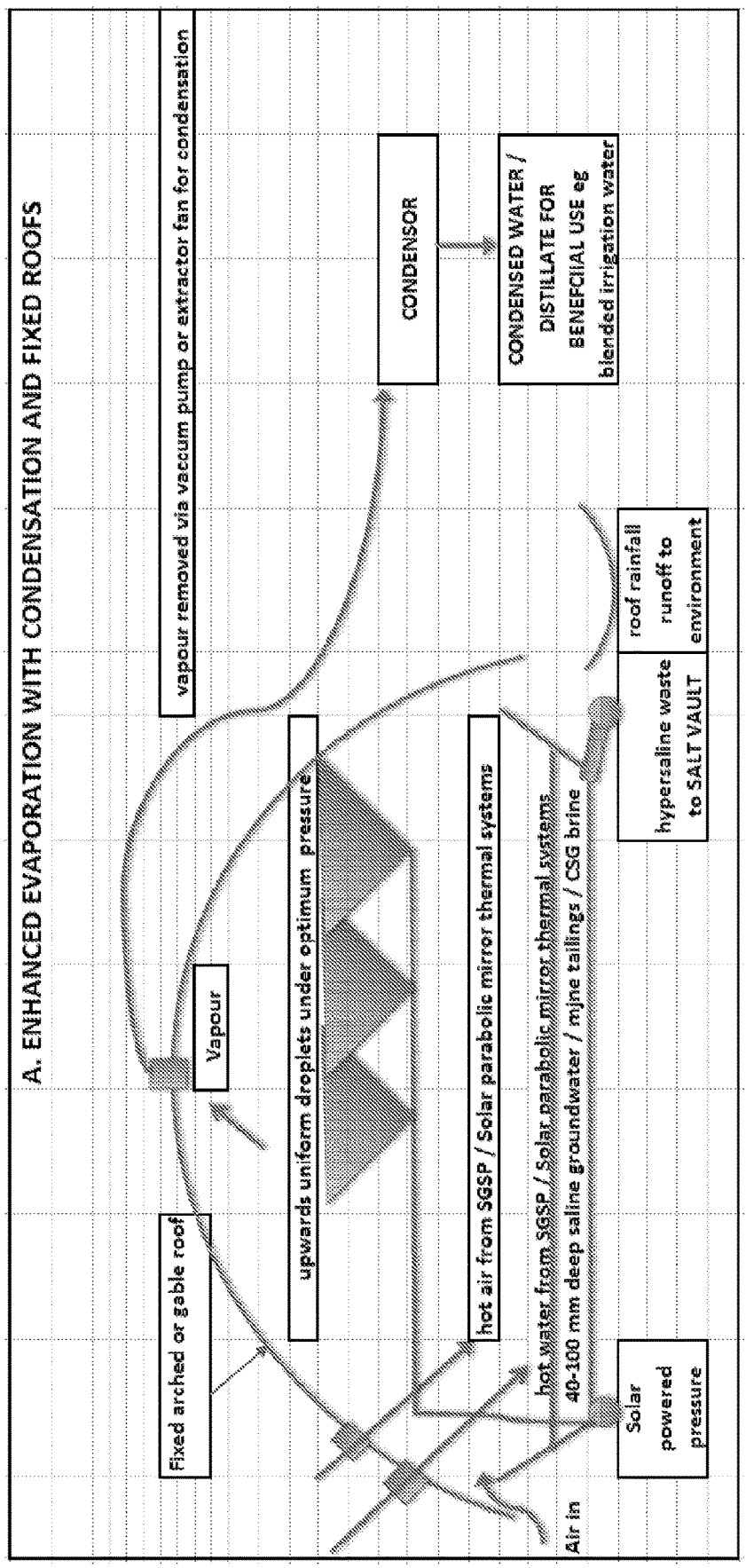
FIG. 5 is a schematic illustration of the operation of enhanced evaporation with condensation in a pond of a preferred embodiment with a fixed roof.
Figure 6:
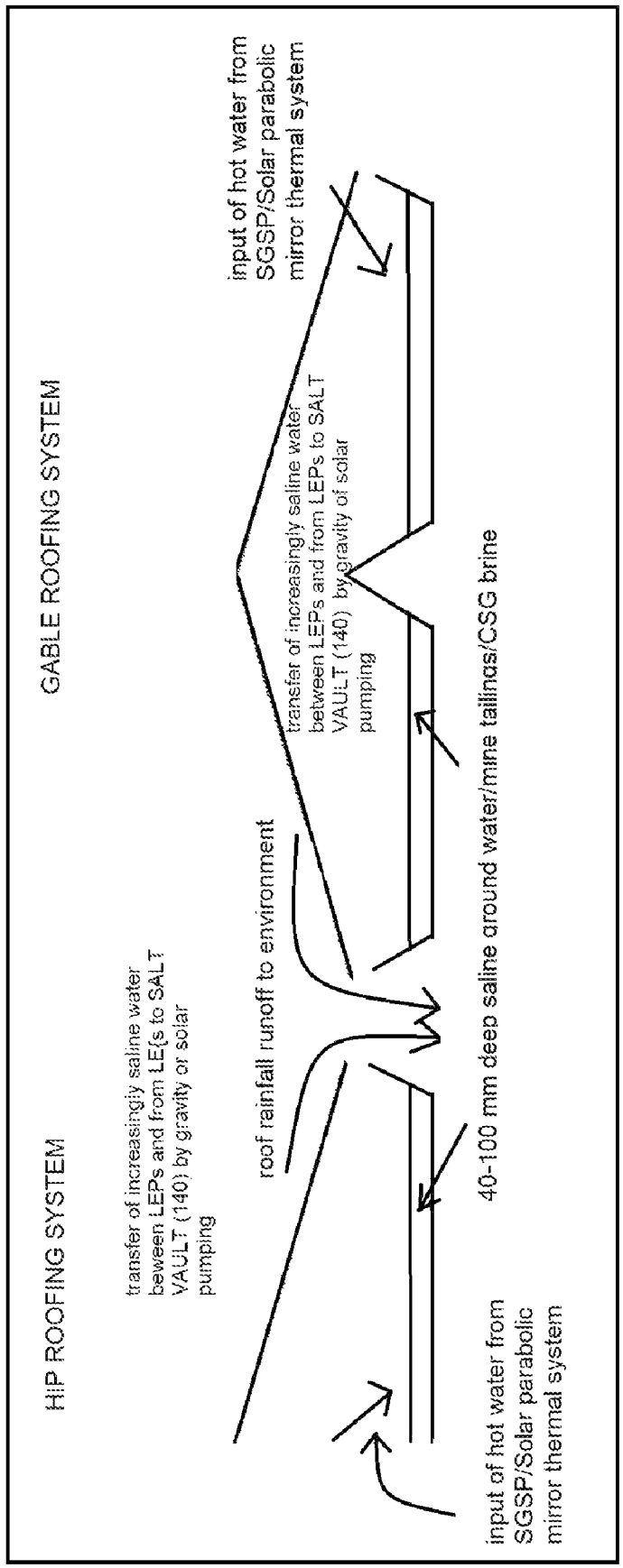
FIG. 6 is a schematic illustration of the operation of enhanced evaporation with condensation in a pond of a preferred embodiment with a retractable/expandable roof.
Figure 7:
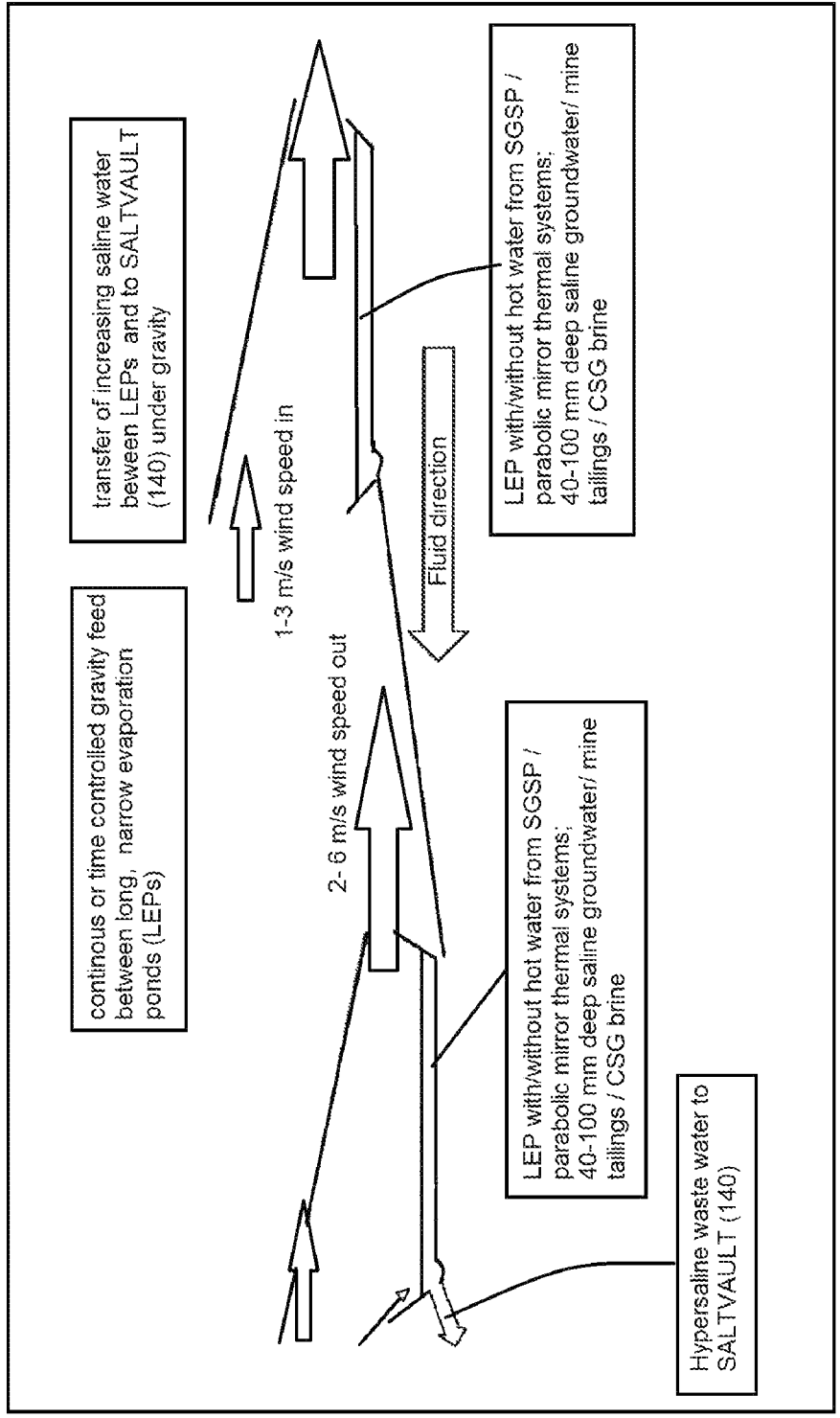
FIG. 7 is a schematic illustration of the operation of a system of a preferred embodiment on moderately sloping ground with a number of ponds in series.

As best illustrated in FIG. 3, the storage pond 140 comprise a reservoir 305, in which the highly concentrated contaminated water 310 is held, and a weather proof cover 315, covering the reservoir 305 to define a chamber, much like the evaporation ponds 115.

A lattice of floating sprinklers 320 is provided on the contaminated water 310 and is configured to spray water in the chamber from a plurality of nozzles. The sprinklers 320 are, similar to the sprinklers 220, and thus low pressure, low trajectory, uniform droplet sprinklers. The cover 315 prevents the sprayed water from leaving the chamber and contaminating the environment, regardless of environmental considerations such as wind, and shelters the contaminated water 310 from the elements.

The cover 315 is, much like the cover 215, formed of UV stabilised, transparent plastic, which is about 1.5 mm thick, is supported by a frame, and is retractable. Similarly, the cover 315 defines a roof over the reservoir 305, and includes vapour outlets 325 located periodically along a length of the cover, near an apex of the arched roof, and are coupled to the condenser 125 for condensing water from the vapour.

The extracted vapour may be mixed with the vapour of the evaporation ponds, or be injected separately into a common condensation process, and may be used beneficially as described above. Similarly, in alternative embodiments, separate condensers may be used for the evaporation ponds and storage ponds.

The storage pond 140 may include one or more agitators 330, along a base 305a of the reservoir 305, to agitate the contaminated water 310. This is particularly useful in breaking crystals and crusts that may form on the contaminated water 310, and can further enhance evaporation.

The agitators 330 may be configured to operate continuously or periodically, and at a variable or fixed rate. The agitators 330 may be mechanical, utilise an inlet of the storage pond 140 (e.g. that contaminated water is sprayed in at high pressure to agitate the other water therein), or agitate the water/crystals/slurry by any suitable means.

The storage pond 140 includes welded HDPE sheet which lines bunds 335 and the floor of the pond as one continuous sheet that extends along a length of the reservoir, and above ground level 340. The bunds 335 ensure that the contaminated water does not leak from the pond 140, and provides increased storage. The bunds may be formed of compacted soil.

The reservoir 305 may be formed in the ground by a laser guided grader or scraper, as outlined above, and be HDPE lined, or more preferably double lined, which protects (as required by best practice and environmental regulation) from the contaminated water 310 leaching into the environment. The reservoir 305 may be formed above ground with suitable insulated materials to restrict heat loss.

The reservoir 305 includes a planar base 305a, from which sidewalls 305b upwardly and outwardly extend. The reservoir 305 is about 1.5 m deep (i.e. the base 305a is about 1.5 m below ground), 2.5-4 m wide at the base 305a with 1:1 grade (45 degree) walls 305b extending upwardly and outwardly therefrom. The bunds 335 are advantageously about 1.5 m high (i.e. 1.5 m above ground). The entire pond 140 (including bund) is thus about 8.5-10 m wide at an upper edge, and about 3 m deep.

The length of the pond 140 is variable depending on the waste water feed rate, the waste chemistry, the rate of evaporation to dry solid and harvesting requirements, but is typically in the order of about 50 m. These ponds can be increased in number as the demand to safely store crystalline salt increases.

The contaminated water is held in the pond as long as desired, and the resulting highly saline solution and/or crystals (or solids) may be extracted when needed for external beneficial use using a solids removal model 145. The solids removal module 145 may be mechanical, comprise a pump, or utilise any suitable process for the removal of highly saline water and/or crystals, including a sludge or slurry thereof. Most highly saline water in 145 will be recycled to the basal layer of the SGSP via a suitable pump.

In the case of high sodium salts, such product may have high value in the chemical industry, and crystalline salt may be used in stockfeed or fertiliser/soil amendment markets. Hypersaline or crystalline salts may be potentially combined with other wastes to make building products or other commercial materials. Alternatively, the salts or crystals may be permanently (or semi-permanently) encapsulated.

The system and components described above is preferably driven by renewal energy, and even more preferably solar and wind driven. In the event of commercialisation of electrical potential energy differences between the EZ zones and bulk water of water storages this energy may be extracted via suitable electrodes for additional system power. As such, the system can be installed adjacent to a mine tailings dam, or other suitable contaminated water source, without needing to be coupled to a power network.

In a preferred embodiments, solar panels or heliostats are associated with, and thus power pumping, heat exchange, operational and environmental monitoring, condensation and saline/mineralised product export components of the system. This reduces the amount of electrical cabling required, and increases redundancy in the system. As an illustrative example, the floating sprinklers described above may be associated with floating solar panel, which avoids the need for cabling to other components.

In the case of solar or wind power, the system preferably also includes batteries and inverters, for the storage of energy therefrom for the reliable supply of constant energy for 240/415 V pumps, compressors requiring constant power input. This enables the system to operate when it is dark or not windy. In the case of expandable/retractable roofs which may be closed and opened on average two times per day in overcast/low to high rainfall conditions requiring up to a 3 KW power supply for 3 minutes per roof movement. These short duration actions would be more cost-effectively executed by a network of one or more small diesel generators which are switched on and off remotely by the cloud based information system driven critical environmental triggers involving acceptable/unacceptable relative humidity, incident solar radiation and barometric pressure indicators from the site weather station. Solar panel/battery/inverter systems for such discontinuous power demand is not recommended. Solar panel/direct 12 volt pumping from saline waste water source to brine pond would be suitable up to 20 m head and 20,000 L/day applications for small projects. For larger projects solar panel/battery/inverter powered pumping systems are preferred.

According to certain embodiments, the system is controlled by an intelligent controller. The controller may choose when to feed water into the evaporation and/or storage ponds, and when to operate tightly controlled above water body aerosol production to enhance effective evaporation surface area condenser or opening and closing of rainfall exclusion roofs. The controller may choose at what rate waste water can be continuously fed during the day to maintain a constant evaporation volume, either under gravity or low pressure pumping from header tank to LEPs via numerous 13 mm PE tubes on an insulated HDPE narrow strip base or recharged daily to a prescribed average depth. Similarly, the jets producing accurate size droplets/aerosols may continue to operate while still efficient (i.e. water is evaporating), or operate at certain times of day. The controller would send alerts to the site operator and other designated recipients when abnormal system behaviour was detected eg. changed flow rates indicating a leakage or changed current flow or operating temperature of water and vacuum pumps, compressors, extractor fans and electric motors which expand and retract rain exclusion roofing.

In some embodiments, the heater 135 comprises a plurality of 13 mm polyethylene pipes on or embedded in a high heat retention medium and/or a saline gradient solar pond or thermal energy sink potentially augmented by a parabolic mirror water heating system.

FIG. 4 illustrates a high saline heating pond 400, according to an embodiment of the present invention. The high SGSP pond 400, receives hypersaline brine from the evaporation ponds 115 or crystalline salt from elsewhere, and uses solar energy to heat entrained saline water up to 100° C. The heated brine water is then a) circulated through insulated piping to and from long, narrow, shallow evaporation ponds (LEPs) to exchange such heat with evaporating water via uninsulated pipework accelerated evaporation via an uninsulated pipe and as well as to b) heat air chamber wind if this augments evaporation through an efficient chamber air temperature management above the total pond evaporating water surface. The same heated air, heated water and compressed air bubbling management system (when entrained salinities exceed 40,000 mg/l TDS) FIG. 1, pond 140, can be used to accelerate the production of marketable crystalline salt from hypersaline solutions, or more specifically in storage pond 140 or pond 300.

In particular, the SGSP is lined with a HDPE liner 405, to define a chamber for receiving the hypersaline water 410. As solar energy falls on the heating pond 400, it heats the water adjacent to the bottom of the pond (1 m depth normally). When water at the bottom of the pool is heated, it does not mix readily with the lower salinity water above it in the Non-Convective Zone (NCV). As such, layers are formed, where the high-salinity lower layer is heated up to 80° C. normally, peaking at about 100° C. and annually averaging 65° C., while the low-salinity water above it is much cooler (e.g. about 50° C.). This hot, salty water can then be pumped from the bottom of the pond 400 using a conduit 415 as a source of thermal energy for use in heated water returning to shallow evaporating water pond 200 or via insulated polyethylene or polypropylene pipes exchanging heat in 400 NCZ and LCZs and then releasing such heat in pond 200 volumes as part of a continuous cycle.

An insulated layer 420 is provided surrounding HDPE liner 405 (or between the double liners), to prevent heat transfer to the earth.

In some embodiments, there may be no need for condensed water. In such case the vapour may be released to atmosphere.

In an alternative embodiment of the present invention, the storage ponds 140 may be provided with reduced evaporation pond 115 capacity prior to hypersaline water entering 140 for production of crystalline waste salt. This is particularly useful when ion exchange (IX), reverse osmosis (RO), or IX/RO or thermal distillation or multi-effects distillation or membrane distillation is used to provide primary water desalination treatment producing a brine waste water stream.

While the above description has focused on saline water, in other embodiments the system may be modified to suit biological waste, such as animal and human waste. In such case, the waste may be mechanically pressed to produce a semi-solid material having a water content of about 20-30% and an eluate.

The resulting eluate may be concentrated, as describe above, to provide a concentrated nutrient rich liquid fertiliser. The remaining solid/semi-dry matter can then be dried in evaporation ponds, similar to the ponds 115 describe above, but without sprinklers. Instead, rollers may be used to ted the matter to increase evaporation.

Once the solid matter is below about 10-15% in water content, it may be raked sideways in the pond where it can be baled into small or large square bales.

Similarly, high sugar or high protein waste food products may be diced and then mechanically pressed to generate fluid and solid/semi-dry matter, which is processed in a similar manner to the biological waste described above. The concentrated eluate (fluid) from this process is particularly valuable as a livestock stockfeed supplement. High sugar carrot tops are particularly suitable for this process, but any high sugar or high protein waste food products may be used.

This systems and methods described above are particularly relevant in managing salinized and mineralised waste waters in agriculture and horticulture, mining, gas, petroleum production sectors, as well as in municipal and rural water supply. While specific embodiments are described, the systems and methods are able to be easily adapted to suit the needs of other sectors, such as the human, animal, agro-processing waste sectors in reducing waste management costs, enhancing the recycling of nutrients for food production and in some cases for converting food industry wastes to valuable stock feeds.

Embodiments of the invention may accelerate the evaporation of waste water following primary desalination treatment of moderately to highly saline groundwater by other technologies referred to in [0106], and provide safe, low cost, accessible storage of derived inorganic, metallic and non-metallic salts. This also enables subsequent commercialisation of such salts where a market exists.

The recovery of vapour from vacuum applied to the clear plastic roofing enhances evaporation, and excludes rainfall from diluting the waste waters and provides the resource to condense and produce a pure water condensate/distillate for beneficial use.

Embodiments of the invention described above are low cost (eg up to $4000/ML for recovering evaporation condensate for beneficial use and for storing crystalline waste salt in the system temporarily (where a commercial market exists) or permanently where no market exists. Where a commercial market exists for waste salt and including the re-processing of valuable entrained minerals, this can significantly reduce the net cost of the total process per ML of waste water treated. The process is totally, sustainable in being able to completely remove contaminants from water and safely store such wastes in perpetuity, if necessary. The closest commercial enhanced evaporation competitors to the fully optioned process with potential condensate/distillate for beneficial use are solar powered multi-effects distillation, new emerging commercial membrane distillation processes or reverse osmosis, forward osmosis or thermal distillation processes all with supporting high energy crystallisers costing in the region of $20000 to $30000/ML of treated waste water.

The commercialisation of the above described embodiments may significantly benefit the economic viability of coal seam gas, coal, and other mining industries as well as high value agriculture and horticulture and regional municipalities constrained by current lack of affordable treatment of saline surface waters or saline groundwaters, which otherwise have high processing costs associated with the salinised/mineralised waste water produced. Furthermore, as embodiments of the present invention provide long term storage of such waste, whereby the environmental risks associated with developments in the renewable and non-renewable resources sector is greatly reduced. This can include systems where non-compliant mines have been abandoned but are now able to rehabilitated and re-activated as waste management is now affordable.

Where groundwater is too saline to grow high value crops, the groundwater may be processed using the above described methods and systems to generate condensate/low salinity water, which can be used to dilute saline groundwater to a level suitable to specific crops. Furthermore, the sale of any salts associated with this process may offset part of the cost associated with operating or installing such systems. In such case, the use of such systems may improve the soil quality over time through removal of salt therein.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An outdoor water management system comprising:
   a terminal reservoir configured to receive concentrated contaminated water;
   a weather proof cover, covering the terminal reservoir to define at least one chamber; and
   wherein the at least one chamber is configured to further concentrate the contaminated water by removing evaporated water from the at least one chamber while providing long-term weatherproof storage of the further concentrated contaminated water within the chamber.

2. The outdoor water management system of claim 1, comprising a plurality of reservoirs provided in series wherein contaminated water to be treated flows through each reservoir of the plurality of reservoirs to generate the concentrated contaminated water that is received by the terminal reservoir.

3. The outdoor water management system of claim 2 wherein the plurality of reservoirs comprise elongate, lined enhanced evaporation ponds with a depth of up to 100 mm.

4. The outdoor water management system of claim 2 configured to heat the contaminated water.

5. The outdoor water management system of claim 1 wherein the terminal reservoir is provided with a shaped roof with at least one entry to funnel wind across the reservoir or increase wind speed.

6. The outdoor water management system of claim 1 further including at least one nozzle configured to spray the contaminated water to enhance effective evaporating water surface area in the terminal reservoir.

7. The outdoor water management system of claim 2 wherein at least one of the plurality of reservoirs is a salinity gradient solar thermal pond.

8. The outdoor water management system of claim 1 wherein the terminal reservoir is provided with evaporated water vapor removed under a vacuum.

9. The outdoor water management system of claim 8 wherein the evaporated water vapour removed is then condensed.

10. The outdoor water management system of claim 2 wherein sub-surface pond water bubbling or sparging is used in at least one of the plurality of reservoirs.

11. The outdoor water management system of claim 2 wherein at least one of the plurality of reservoirs provided in series is shaped such that contaminated water drains to a low point for transfer to of the plurality of reservoirs provided in series.

12. The outdoor water management system of claim 2 wherein the reservoirs are elongate.

13. The outdoor water management system of claim 2 wherein the reservoirs are lined using high density polyethylene sheeting.

14. The outdoor water management system of claim 2 wherein the contaminated water enters each reservoir under gravity.

15. The outdoor water management system of claim 1, further comprising a pump to pump the contaminated water through the system.

16. The outdoor water management system of claim 15 wherein the pump is configured to pump water at a rate to add turbulence to the water in the reservoir and enhance evaporation.

17. The outdoor water management system of claim 1 further comprising an agitator, configured to agitate the contaminated water in the terminal reservoir.

18. The outdoor water management system of claim 1 wherein the contaminated water is heated within the terminal reservoir.

19. The outdoor water management system of claim 1 further including a salinity gradient solar pond to receive contaminated water to accelerate evaporation wherein the terminal reservoir is configured to receive hypersaline contaminated water from the salinity gradient solar pond and further evaporate it to a crystalline salt.

* * * * *

UNITED STATES PATENT AND TRADEMARK OFFICE
CERTIFICATE OF CORRECTION

PATENT NO. : 11,261,103 B2
APPLICATION NO. : 16/635718
DATED : March 1, 2022
INVENTOR(S) : David Campbell Macfarlane It is certified that error appears in the above-identified patent and that said Letters Patent is hereby corrected as shown below:

In the Claims

Column 17, Claim 9, Line 12, please delete "vapour" and insert -- vapor --.

Signed and Sealed this
Tenth Day of May, 2022

Katherine Kelly Vidal
*Director of the United States Patent and Trademark Office*